United States Patent [19]

Yamada et al.

[11] 4,050,077

[45] Sept. 20, 1977

[54] LIQUID DROPLET SUPPLYING SYSTEM

[75] Inventors: Takahiro Yamada; Tetsuo Doi, both of Hitachi, Japan

[73] Assignee: Hitachi, Ltd., Japan

[21] Appl. No.: 629,566

[22] Filed: Nov. 6, 1975

Related U.S. Application Data

[63] Continuation of Ser. No. 473,899, May 28, 1974, abandoned.

[30] Foreign Application Priority Data

May 30, 1973 Japan ........................ 48-59834

[51] Int. Cl.[2] ........................ G01D 15/18
[52] U.S. Cl. ........................ 346/75
[58] Field of Search ........................ 346/75

[56] References Cited

U.S. PATENT DOCUMENTS

| | | | |
|---|---|---|---|
| 3,334,351 | 8/1967 | Stauffer | 346/75 |
| 3,484,793 | 12/1967 | Weigl | 346/75 |
| 3,512,173 | 5/1970 | Damouth | 346/75 |
| 3,596,275 | 7/1971 | Sweet | 346/75 X |

OTHER PUBLICATIONS

Sweet, R. G.; High-Frequency Oscillography with Electrostatically Deflected Ink Jets; Stanford Electronics Labs, Sel-64-004, Mar. 1964, pp. 6-7.

*Primary Examiner*—Joseph W. Hartary
*Attorney, Agent, or Firm*—Craig & Antonelli

[57] ABSTRACT

Liquid droplets of large diameter and small diameter are alternately emitted from a jet nozzle and are deflected in accordance with control information so that the liquid droplets of large diameter and/or the liquid droplets of small diameter can be directed toward a recording sheet as desired. This system is especially effective in controlling ink droplets in an ink jet recorder using ink.

9 Claims, 14 Drawing Figures

LIQUID DROPLET SUPPLYING SYSTEM

This is a continuation of application Ser. No. 473,899, filed May 28, 1974 now abandoned.

BACKGROUND OF THE INVENTION

1. Field of the Invention

This invention relates to a system for supplying liquid droplets, and more particularly to a system of the kind above described which is suitable for use in an ink jet recorder or the like so that liquid droplets of large diameter and small diameter can be selectively supplied in accordance with information.

2. Description of the Prior Art

In an ink jet recorder, ink droplets are caused to impinge against a recording surface so as to record an information image on the recording surface by an assembly of recording dots formed by the impingement of the ink droplets against the recording surface. These ink droplets are generally obtained by jetting ink under pressure from a nozzle to which vibration is imparted. In a prior art ink jet recorder of electrostatic deflection type, individual ink droplets are charged according to an information image and the flying direction of these charged ink droplets is deflected by deflecting electrodes while such droplets pass through the gap between the deflecting electrodes so that unnecessary ink droplets can be collected by a collector and non-collected ink droplets only can be directed toward and impinge against a recording surface to form recording dots on the recording surface. In a prior art ink jet recorder of electromagnetic deflection type, a ferromagnetic material is mixed in ink and ink droplets are electromagnetically deflected while passing through a deflecting magnetic field. However, these prior art ink jet recorders have been defective in that there are limitations in the tone and resolution of recorded images and the tone cannot be closely and smoothly reproduced due to the fact that the size of the ink droplets is substantially constant. Further, the prior art ink jet recorders have been defective in that there is a limitation in the range of the size of characters which can be recorded in a natural form by such ink droplets (recording dots) of constant size, and when characters having a size larger or smaller than the above range are recorded, the recording dots may be too small to give a natural representation or too large to be identified.

SUMMARY OF THE INVENTION

It is an object of the present invention to provide a liquid droplet supplying system which is capable of selectively supplying large and small liquid droplets.

Another object of the present invention is to provide a liquid droplet supplying system which is suitable for use in the ink jet recorder.

Still another object of the present invention is to provide a liquid droplet supplying system for use in an ink jet recorder which makes it possible to record an information image of high quality.

Yet another object of the present invention is to provide a liquid droplet supplying system for use in an ink jet recorder which makes it possible to record an information image in which the tones of an original are efficiently reproduced.

A further object of the present invention is to provide a liquid droplet supplying system for use in an ink jet recorder which makes it possible to record an information image in which the details of an original are easily reproduced.

Another object of the present invention is to provide a liquid droplet supplying system for use in an ink jet recorder which makes it possible to record thick and thin characters as desired.

The liquid droplet supplying system according to the present invention is featured by the fact that large and small liquid droplets are periodically and alternately jetted from a jet nozzle and are selectively supplied in accordance with an information signal.

Other objects, features and advantages of the present invention will be apparent from the following detailed description taken in conjunction with the accompanying drawings.

DESCRIPTION OF THE PREFERRED EMBODIMENTS

Figure 1:
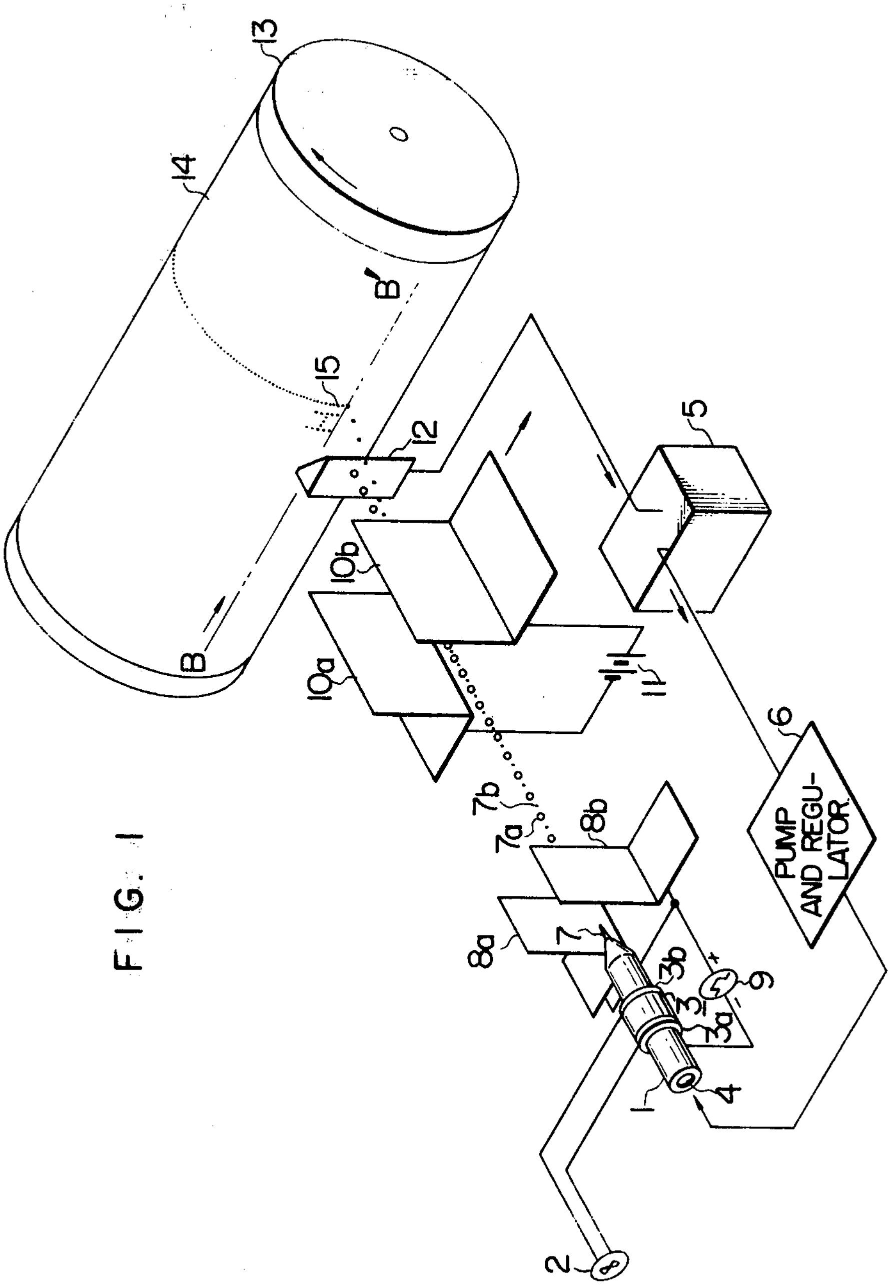
FIG. 1 is a diagrammatic view of an ink jet recorder based on the principle of the present invention.

Applications of the present invention to an ink jet recorder will be described with reference to the drawings. Referring to FIG. 1, an ink jet nozzle 1 has a nozzle diameter of about 60$\mu$, and an annular electro-mechanical transducing element 3 is mounted on the body of this nozzle 1 to mechanically vibrate the nozzle 1 at a frequency of about 70 kHz. This electro-mechanical transducing element 3 is made of an electro-strictive material, for example, a sintered mixture of lead titanate and lead zirconate (PZT). A pair of electrodes 3*a* and 3*b* are mounted on the opposite ends of the electro-mechanical transducing element 3 and are connected to a high-frequency power source 2 of 70 kHz which applies a voltage of 10 to 30 volts across these electrodes 3*a* and 3*b* to cause electro-strictive oscillation of the electro-mechanical transducing element 3 thereby providing the vibrating energy. This energy may however be provided by a magneto-strictive element. A stream of ink 4 under pressure is supplied to the nozzle 1 from a tank 5 through a pump and pressure regulator unit 6, and this pressure is set at about 3 to 4 kilograms per square centimeter. A pair of charging electrodes 8*a* and 8*b* are disposed in front of the nozzle 1 so as to apply electrical charge to large ink droplets 7*a* and small ink droplets 7*b* separated from a columnar ink stream 7 jetted from the nozzle 1. The positional relationship between the nozzle 1 and the charging electrodes 8*a*, 8*b* is such that the columnar ink stream 7 jetted from the nozzle 1 is separated into the large and small ink droplets 7*a* and 7*b* at a suitable position intermediate between these charging electrodes 8*a* and 8*b*. These two charging electrodes 8*a* and 8*b* are spaced apart by a gap of about 2 mm and have a length of about 5 mm. These electrodes 8*a* and 8*b* are electrically connected with each other to have the same potential, and a source 9 of information signal voltage applies an information signal voltage of about 200 volts across the nozzle 1 (to which the pressurized ink 4 is supplied) and the electrodes 8*a* and 8*b* according to information.

A pair of deflecting electrodes 10*a* and 10*b* are disposed opposite to each other on opposite sides of the flying path of the ink droplets 7*a* and 7*b*, and a source 11 of high d.c. voltage is connected to these electrodes 10*a* and 10*b* to apply a d.c. voltage of 3 to 4 kilovolts thereacross. These deflecting electrodes 10*a* and 10*b* are disposed at a position spaced apart by about 5 mm from the charging electrodes 8*a* and 8*b*. The gap between these deflecting electrodes 10*a* and 10*b* is about 5 mm and 7 mm at the inlet and outlet respectively, and the length thereof is about 25 mm. A collecting edge 12 is provided so as to collect unnecesary ink droplets which are not deflected by the deflecting electrodes 10*a* and 10*b*. This collecting edge 12 is disposed at a suitable position relative to the deflecting electrodes 10*a* and 10*b* so that the ink droplets advancing along a straight path impinge against the edge 12 to be collected thereby and the ink droplets advancing along a curved path pass by the edge 12 without impinging thereagainst. A recording sheet 14 is wound around the outer periphery of a rotary drum 13 which is arranged to rotate in a direction as shown by the arrow by a drive motor (not shown). Thus, the ink droplets impinging against the recording sheet 14 form recording dots 15 to record an information pattern on the recording sheet 14. The ink jetting system is arranged to move in parallel with the axis of the rotary drum 13 so that the point of impingement of the ink droplets against the recording sheet 14 moves on the chain line B–B'. The large and small ink droplets 7*a* and 7*b* produced under the conditions above described have respective diameters of about 120 μ and 40 μ. Thus, the recording dot 15 formed by each of the large ink droplets 7*a* has a diameter of about 300 μ, and the recording dot 15 formed by each of the small ink droplets 7*b* has a diameter of about 100 μ. The rotary drum 13 carrying the recording sheet 14 thereon is rotated at a circumferential speed of about 50 centimeters per second.

When this ink jet recorder is used as a facsimile receiver, the information signal voltage source 9 and the drum drive motor (not shown) are controlled by a facsimile information signal and a synchronizing signal respectively.

Figure 2:
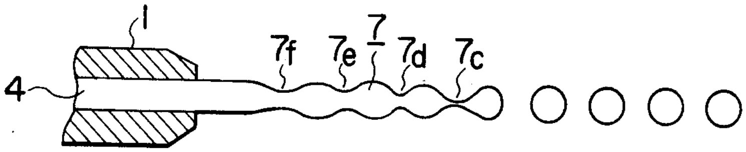
FIG. 2 shows a manner of formation of ink droplets.
Figure 3:
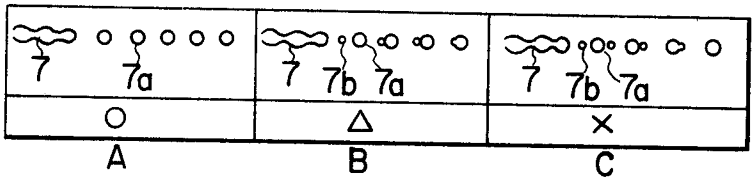
FIG. 3 shows flying patterns of the ink droplets.

The manner of production of the ink droplets in such ink jet recorder will be described with reference to FIGS. 2, 3, and 4. Due to the fact that the nozzle 1 is mechanically vibrated, spaced constricted portions 7*c*, 7*d*, 7*e* and 7*f* are successively formed in the columnar stream 7 of the pressurized ink 4 jetted from the nozzle 1 as shown in FIG. 2. This constriction phenomenon proceeds with the advancing movement of the columnar ink stream 7 until finally successive ink droplets 7*a* and 7*b* are separated from the columnar ink stream 7.

A test made by the present inventors has proved that these ink droplets 7*a* and 7*b* appear in various patterns. More precisely, the ink droplets appear and fly in various patterns when the intensity of vibration imparted to the nozzle 1 and the pressure of the ink 4 supplied to the nozzle 1 are varied while maintaining constant the frequency of vibration of the nozzle 1, that is, the frequency of the high-frequency power source 2. In FIG. 3, there are shown various states of appearance and various flying patterns of these ink droplets. In A of FIG. 3, the ink droplets 7*a* of large diameter are solely produced. In B, the ink droplets of large diameter and small diameter 7*a* and 7*b* are alternately produced and the flying ink droplets 7*b* of small diameter catch up with the flying ink droplets 7*a* of large diameter to join the latter. In C, the ink droplets of large diameter and small diameter 7*a* and 7*b* are alternately produced and the flying ink droplets 7*a* of large diameter catch up with the flying ink droplets 7*b* of small diameter to join the latter.

Figure 4:
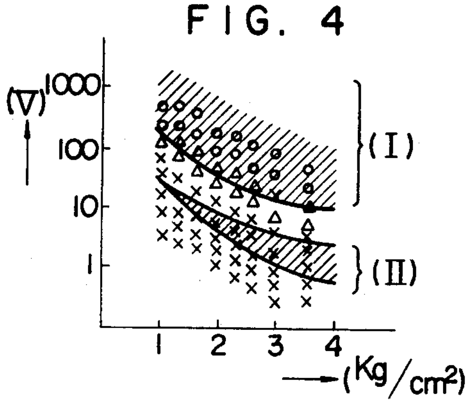
FIG. 4 is a graph showing the flying characteristic of the ink droplets.

These relations are plotted in FIG. 4 in which the horizontal axis represents the ink supply pressure in a linear scale and the vertical axis represents in a logarithmic scale the voltage of the high-frequency power source 2 which relates to the intensity of vibration imparted to the nozzle 1. The symbols *o*, Δ and *x* in FIG. 4 correspond to the patterns shown in A, B and C of FIG. 3 respectively. In the hatched region I, the ink droplets 7*a* of large diameter are solely produced or the ink droplets 7*b* of small diameter catch up immediately with the ink droplets 7*a* of large diameter to join the latter even when the ink droplets 7*b* of small diameter may appear. In the hatched region II, both the ink droplets 7*a* of large diameter and the ink droplets 7*b* of small diameter are produced, but they must fly a long distance until they join with each other. Thus, in this latter region, the ink droplets 7*a* of large diameter and the ink droplets 7*b* of small diameter are substantially coexistent. It is disirable to experimentally confirm this range in practical applications since this range is variable depending on the factors including the shape of the nozzle 1, the property of the electro-strictive element 3 and the property of the ink 4. In the practice of the present invention, various constants should be selected to satisfy the conditions which permit the coexistence of the large and small ink droplets 7*a* and 7*b*.

Figure 5:
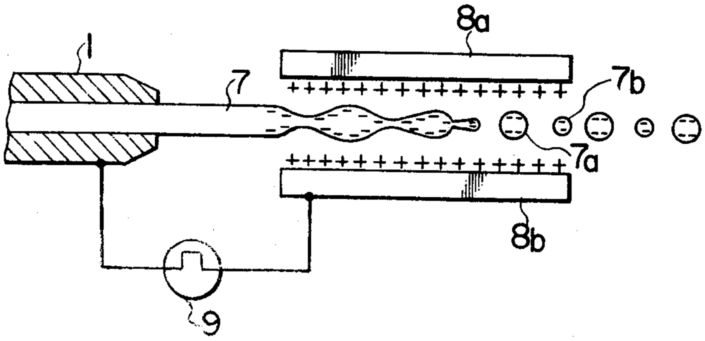
FIG. 5 shows a manner of charging the ink droplets.

The ink droplets 7*a* and 7*b* are charged in a manner as described with reference to FIG. 5. The nozzle 1 and ink 4 used in the present invention are electrically conductive. Thus, when the charging voltage is applied across the nozzle 1 and the charging electrodes 8*a*, 8*b*, the surface of the columnar ink stream 7 is charged to a polarity opposite to the polarity of the electrode plates. The ink droplets 7*a* and 7*b* are separated successively from the columnar ink stream 7 in the above state with the progress of the constriction phenomenon and thus hold the charge carried by the columnar ink stream 7. The ink droplets 7*a* and 7*b* are charged to a negative polarity when the polarity of the charging electrodes 8*a* and 8*b* is positive. The quantity of the charge is proportional to the voltage generated by the information signal voltage source 9 at the moment of separation of the ink droplets from the columnar ink stream 7.

Figure 6:
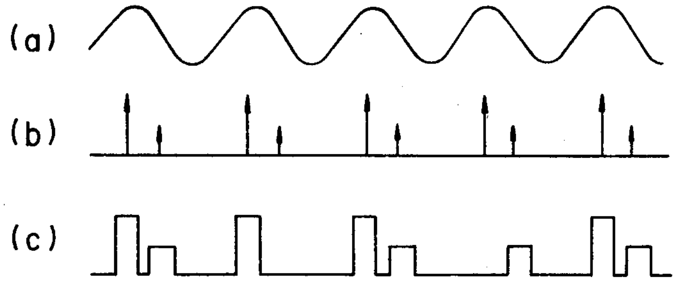
FIG. 6 shows a manner of controlling the ink droplets.

The relation between the phase of vibration and the phase of separation of the ink droplets 7*a* and 7*b* from the columnar ink stream 7 is shown in FIGS. 6*a* and 6*b*. FIG. 6*a* shows the waveform of the voltage applied to the electro-mechanical transducing element 3, and FIG. 6*b* shows the phase at which the ink droplets are separated from the columnar ink stream 7. The long arrow in FIG. 6b represents the separating phase of the large ink droplets 7a, and the short arrow represents the separating phase of the small ink droplets 7b. Due to the fact that such a synchronous relation exists between the vibration imparting voltage waveform and the separating phase of the ink droplets, the charge of negative polarity can be selectively applied to the desired ink droplets when this separating phase is detected and a voltage having a waveform as shown in FIG. 6c is applied to the charging electrodes 8a and 8b. Less deflecting force is required for deflecting the small ink droplets 7b to the same degree as that for the large ink droplets 7a. Thus, a lower voltage is applied to the charging electrodes 8a and 8b at the time of separation of the small ink droplets 7b so that the large and small ink droplets 7a and 7b can be deflected to the same degree.

The ink droplets 7a and 7b charged to the negative polarity in the manner above described pass through the gap between the deflecting electrodes 10a and 10b to be deflected toward the deflecting electrode 10b of positive potential. The charged ink droplets 7a and 7b thus deflected do not impinge against the collecting edge 12 and impinge against the surface of the recording sheet 14 to form the recording dots 15 thereon. The ink droplets 7a and 7b which are not charged by the charging electrodes 8a and 8b advance straight without being deflected toward the deflecting electrode 10b and impinge against the collecting edge 12 to be collected thereby. The collected ink returns to the tank 5.

In the arrangement above described, recording is carried out by the charged ink droplets. However, recording can be carried out by the ink droplets which are not charged and advancing straight when the collecting edge 12 is disposed in the flying path of the deflected ink droplets.

Figure 7:
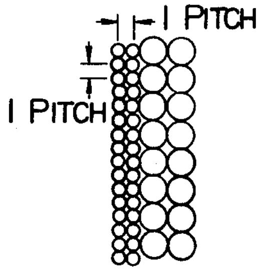
FIGS. 7, 8 and 9 show a few examples of records obtained by recording dots.

The spacing between the recording dots 15 formed by the impingement of the ink droplets 7a and 7b against the surface of the recording sheet 14 is determined by the factors including the flying velocity of the ink droplets 7a and 7b, the circumferential speed of the rotary drum 13 carring the recording sheet 14 thereon, and the speed of the ink jetting system moving in the axial direction of the rotary drum 13 relative to the rotary drum 13. In order to record an information image which is an exact reproduction of an original even in minor details, it is preferably that the recording dots 15 formed by the small ink droplets 7b contact each other at the boundary or slightly overlap each other as shown in FIG. 7.

It is preferable to use the small ink droplets 7b in the case of a record requiring thin lines and to use the large ink droplets 7a in the case of a record requiring thick lines. When the large ink droplets 7a are utilized to provide a record, the recording dot pitch selected so as to be suitable for providing a record by the small ink droplets 7b is too small to attain desired recording. It is thus desirable to selectively charge suitable ones of the required large ink droplets 7a so that they may not excessively overlap each other. The large ink droplets 7a having the diameter previously described which form recording dots of about 300 $\mu$ in diameter are suitable for recording a character of a size of the order of $1.2 \times 1.8$ mm, and the small ink droplets 7b having the diameter previously described (which form recording dots of about 100 $\mu$ in diameter) are suitable for recording a character of a size of the order of $0.5 \times 0.7$ mm.

In recording a continuous pattern, all of the large ink droplets 7a and small ink droplets 7b may be used in a combined or separated manner, or extracted ones of these ink droplets may be used in a combined or separated manner. In this manner, a record which is an exact reproduction of an original in both the tones and the minor details can be obtained efficiently.

Figure 8:
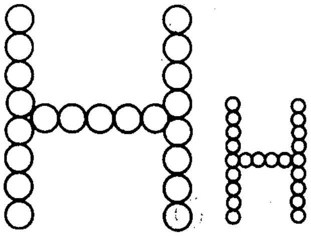

FIG. 8 shows an example in which a character H is recorded in two different forms. The character H of large size is recorded by using solely the large ink droplets 7a, while the character H of small size is recorded by using solely the small ink droplets 7b.

Figure 9:
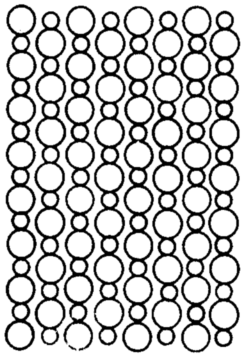

FIG. 9 is an enlarged view of a part of a continuous pattern which is recorded by suitably extracting and combining the large and small ink droplets 7a and 7b. This pattern is a heavy greyish color when generally observed.

In the ink jet recorder above described, the ink droplets are charged according to information to be recorded. However, an information signal may be applied across the deflecting electrodes 10a and 10b and the ink droplets may be uniformly charged to attain the same effect.

In another form of the ink jet recorder which will be described below, a recording sheet 14 is moved in the horizontal direction, that is, in the x-direction, and ink droplets are deflected in the vertical direction, that is, in the y-direction according to information to attain recording. This system is suitable for recording a character in response to the application of a coded information signal.

Figure 10:
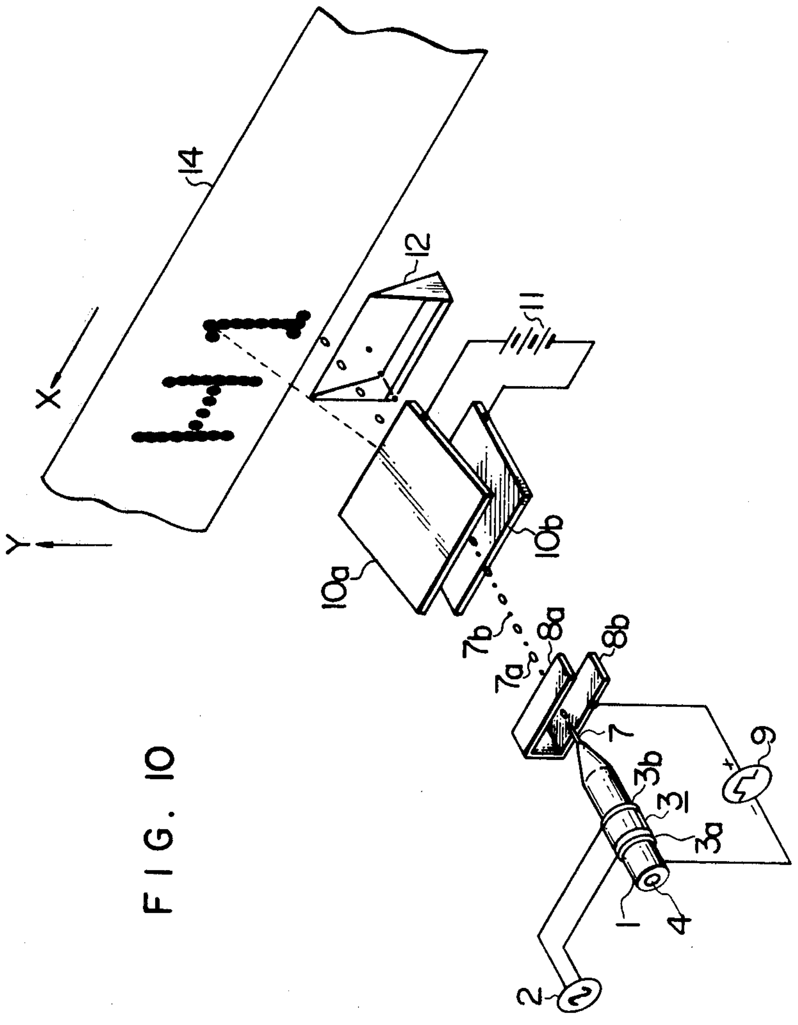
FIG. 10 is a diagrammatic view of another form of the ink jet recorder.

Referring to FIG. 10, a pair of deflecting electrodes 10a and 10b are disposed opposite to each other to define a gap gradually increased in the y-direction, and a collecting edge 12 is disposed at such a position that it collects ink droplets 7a and 7b which are not deflected in the y-direction. Scanning in the y-direction for recording a character according to information is carried out by varying the quantity of charge applied to the ink droplets 7a and 7b thereby varying the degree of deflection of these ink droplets. It will be understood that scanning in the x-direction can also be attained by moving the ink droplet jetting system relative to the recording sheet 14 while fixing the recording sheet 14 against movement in the x-direction.

Figure 11:
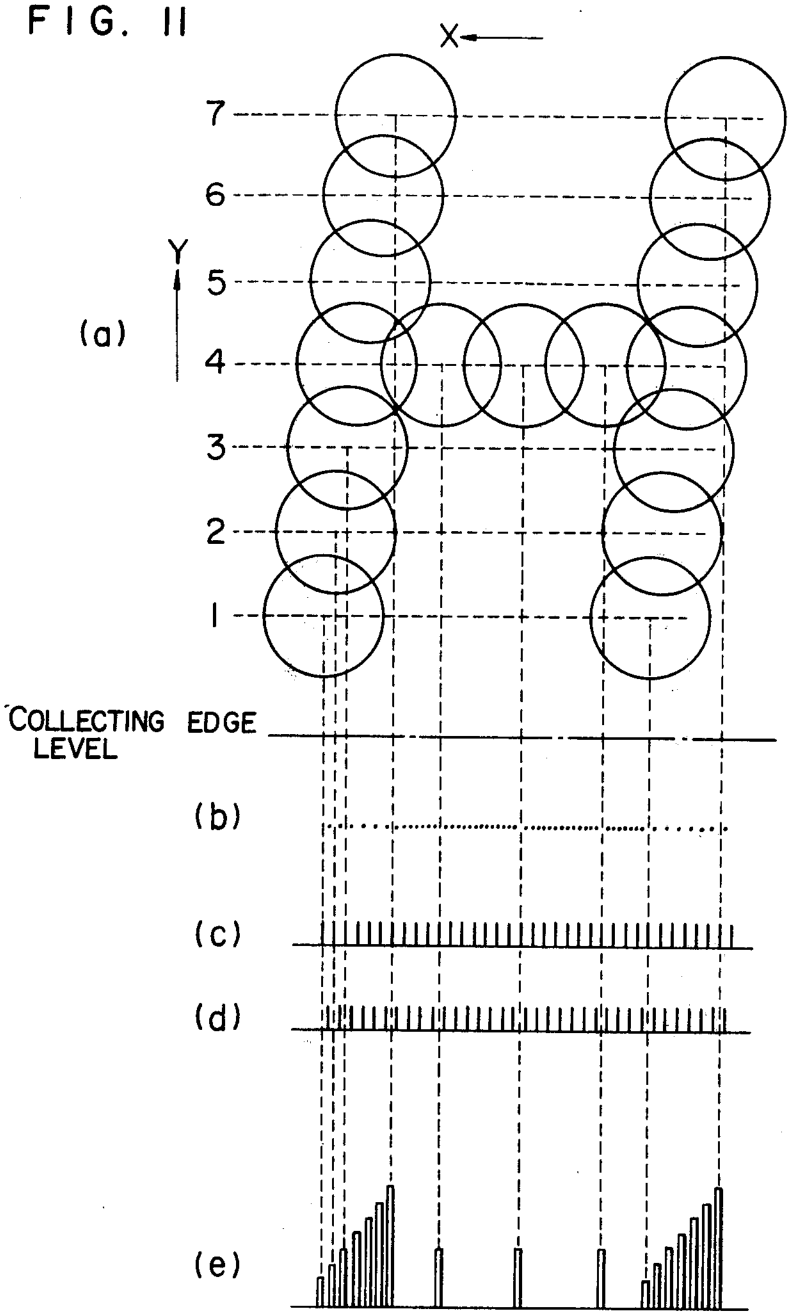
FIG. 11 shows a manner of character pattern signal control for recording such character by the recorder shown in FIG. 10.

FIG. 11 shows a manner of character pattern signal control for recording a character by the recorder shown in FIG. 10. Recorded information is shown in FIG. 11a in which x designates the direction of movement of the recording sheet 14 and y designates the direction of deflection of the ink droplets 7a or 7b. FIG. 11b shows the ink droplets 7a and 7b which are collected by the collecting edge 12. FIG. 11c shows the emission timing of the large ink droplets 7a, and FIG. 11d shows the emission timing of the small ink droplets 7b. FIG. 11e shows the waveform of a charging (deflecting) voltage signal applied to a pair of charging electrodes 8a and 8b. In this example, the recorded information is a character H which is recorded by the large ink droplets 7a.

The charging voltage signal is in the form of synchronizing pulses having a pulse width which can completely cover the emission timing of the large ink droplets 7a as shown in FIG. 11e. In operation, the charging signal voltage is successively increased to successively increase the degree of deflection of the large ink droplets 7a so as to record a line consisting of recording dots applied in the y-direction. Then, the deflecting signal voltage is reduced to the medium level and a plurality of pulses of medium voltage level are generated at suitable timing intervals so as to record a line extending in the $x$-direction from the center of the line extending in the $y$-direction. Subsequently, the signal voltage is successively increased to record another line extending in the $y$-direction. It will be seen that the recording of the line extending in the $x$-direction is attained by feeding the recording sheet 14 in this direction and the recording of the line extending in the $y$-direction is attained by deflecting the ink droplets in this direction. The degree of deflection of the ink droplets is proportional to the quantity of charge carried by the ink droplets, hence, it is proportional to the voltage applied to the charging electrodes 8*a* and 8*b* at the emission timing of the ink droplets.

Figure 12:
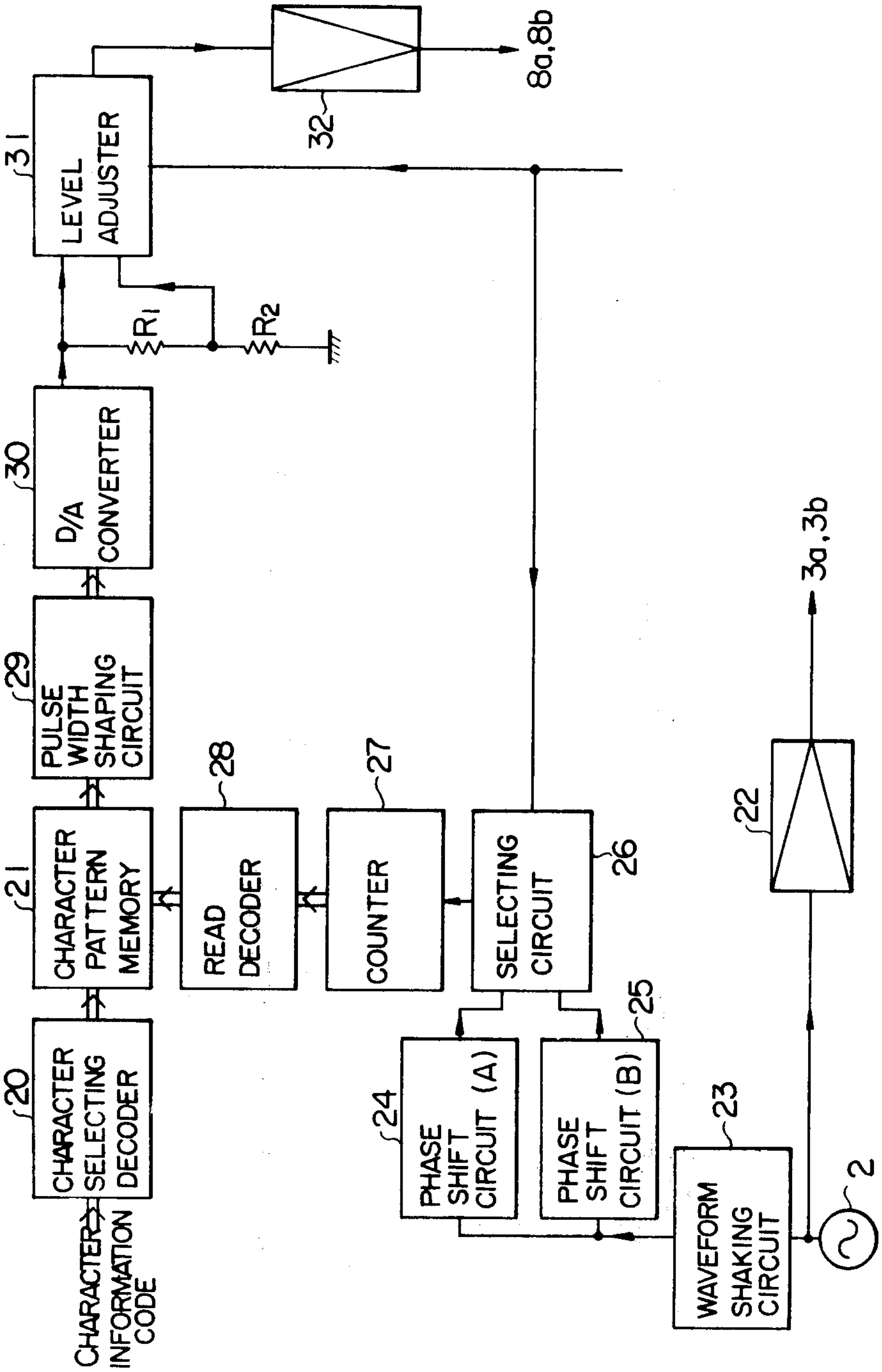
FIG. 12 is a block diagram of a system for attaining the character pattern signal control shown in FIG. 11.

An electrical circuit preferably used for generating such a signal voltage will be described with reference to FIG. 12. The electrical circuit shown in FIG. 12 is adapted for recording a character on the basis of coded information. Referring to FIG. 12, a character selecting decoder 20 selects a character pattern stored in a character pattern memory 21 in response to the application of coded character information thereto. The output of an oscillator 2 is applied through an amplifier 22 to the electrodes 3*a* and 3*b* mounted on the electro-mechanical transducing element 3 which imparts vibration to the ink jet nozzle 1. A waveform shaping circuit 23 shapes the waveform of the output of the oscillator 2, and the output of the waveform shaping circuit 23 is applied to a pair of phase shifting circuits 24 and 25. The phase shifting circuit (A) 24 produces a phase signal used for attaining coincidence between the generation timing of voltage for charging the large ink droplets 7*a* and the emission phase of the large ink droplets 7*a*, and the phase shifting circuit (B) 25 produces a phase signal used for attaining coincidence between the generation timing of voltage for charging the small ink droplets 7*b* and the emission phase of the small ink droplets 7*b*. In response to the application of a selecting signal, a selecting circuit 26 selects one of the phase signals to apply the selected phase signal to a counter 27 which determines the picture elements of one character. The output of the counter 27 is applied to a pattern read-out decoder 28 so that the selected character pattern can be read out from the character pattern memory 21.

A pulse width shaping circuit 29 shapes the pulse width of the pattern signal so that the desired ink droplets can only be charged. A D-A converter 30 converts the digital patten signal into an analog signal and applies this analog signal to a level adjuster 31. In response to the application of the analog signal and selecting signal, the level adjuster 31 adjusts the analog signal input and delivers an output of high level suitable for the deflection of the large ink droplets 7*a* or delivers an output of low level suitable for the deflection of the small ink droplets 7*b*. This level adjuster 31 is in the form of an amplifying circuit having two input terminals. The analog signal is applied directly to one of the input terminals and indirectly to the other input terminal through voltage dividing resistors R1 and R2. The selecting signal controls the operation of this amplifying circuit so that one of these two analog inputs is selected and applied to a video amplifier 32. The video amplifier 32 amplifies the analog signal output of the level adjuster 31 and this amplified output is applied to the charging electrodes 8*a* and 8*b*.

When a large character is recorded by the large ink droplets 7*a*, the output of the phase shifting circuit (A) 24 is selected by the selecting circuit 26, and the high output level of the level adjuster 31 is selected. Thus, the character pattern signal read out from the memory 21 and applied through the pulse width shaping circuit 29 and the D-A converter 30 to the level adjuster 31 is controlled to the level suitable for deflecting the large ink droplets 7*a* and the adjusted output of the level adjuster 31 is applied through the video amplifier 32 to the charging electrodes 8*a* and 8*b*. On the other hand, when a small character is recorded by the small ink droplets 7*b*, the output of the phase shifting circuit (B) 25 is selected, and the low output level of the level adjuster 31 is selected.

Figure 13:
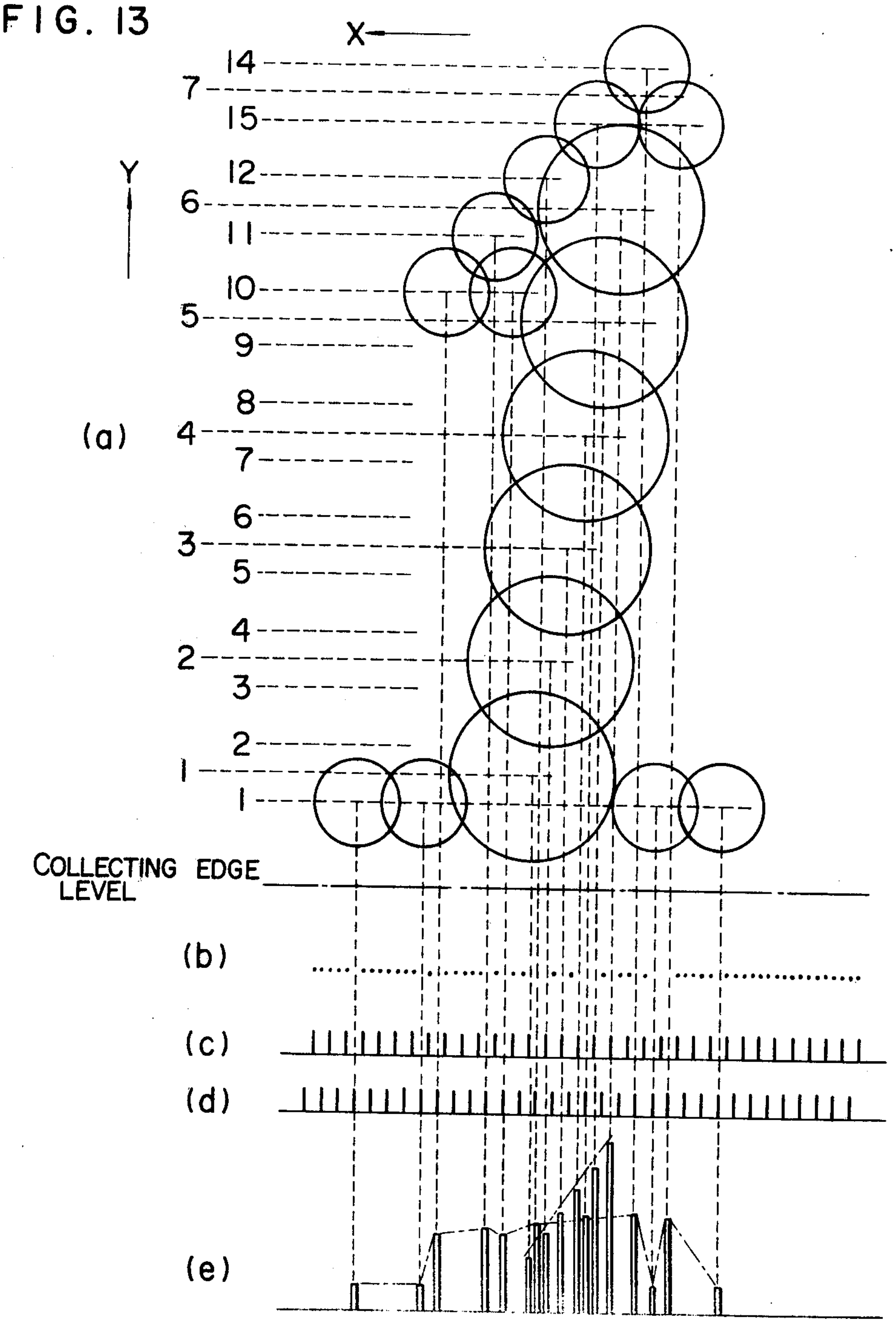
FIG. 13 shows another manner of character pattern signal control.

FIG. 13 shows a manner of character pattern signal control for recording a pattern of high quality by the combined use of the large and small ink droplets. Recorded information is shown in FIG. 13*a* in which $x$ designates the direction of movement of the recording sheet 14 and $y$ designates the direction of deflection of the ink droplets 7*a* and 7*b*. FIG. 13*b* shows the ink droplets 7*a* and 7*b* which are collected by the collecting edge 12. FIG. 13*c* shows the emission timing of the large ink droplets 7*a*, and FIG. 13*d* shows the emission timing of the small ink droplets 7*b*. FIG. 13*e* shows the waveform of a voltage applied to the charging electrodes 8*a* and 8*b*. In this example, the recorded information is a numeral 1.

Due to the fact that the large and small ink droplets 7*a* and 7*b* are deflected in different degrees, it is necessary to provide a character pattern memory for recording with the large ink droplets 7*a* and another pattern memory for recording with the small ink droplets and to combine the signals read out from these two memories for applying this composite signal to the charging electrodes 8*a* and 8*b* in order to attain such manner of information recording. As seen in FIG. 13*e*, the voltage waveform varying along the two-dot chain line in used to deflect the large ink droplets 7*a*, while the voltage waveform varying along the one-dot chain line is used to deflect the small ink droplets 7*b*. In this case, it is necessary to produce the deflecting voltage while taking into account the fact that the small ink droplets 7*b* can be deflected in a large degree with a small charge compared with the large ink droplets 7*a*.

An electrical circuit preferably used for attaining such manner of recording will be described with reference to FIG. 14. The electrical circuit shown in FIG. 14 differs from the electrical circuit shown in FIG. 12 in that the selecting circuit 26 and the level adjuster 31 are eliminated, the character pattern memory 21 is replaced by a memory (A) 21*a* for recording with the large ink droplets 7*a* and another memory (B) 21*b* for recording with the small ink droplets 7*b*, counters 27*a* and 27*b*, read-out decoders 28*a* and 28*b*, pulse width shaping circuits 29*a* and 29*b*, and D-A converters 30*a* and 30*b* are provided for the respective memories 21*a* and 21*b*, and a combining circuit 33 is provided for combining the outputs of the D-A converters 30*a* and 30*b*.

Figure 14:
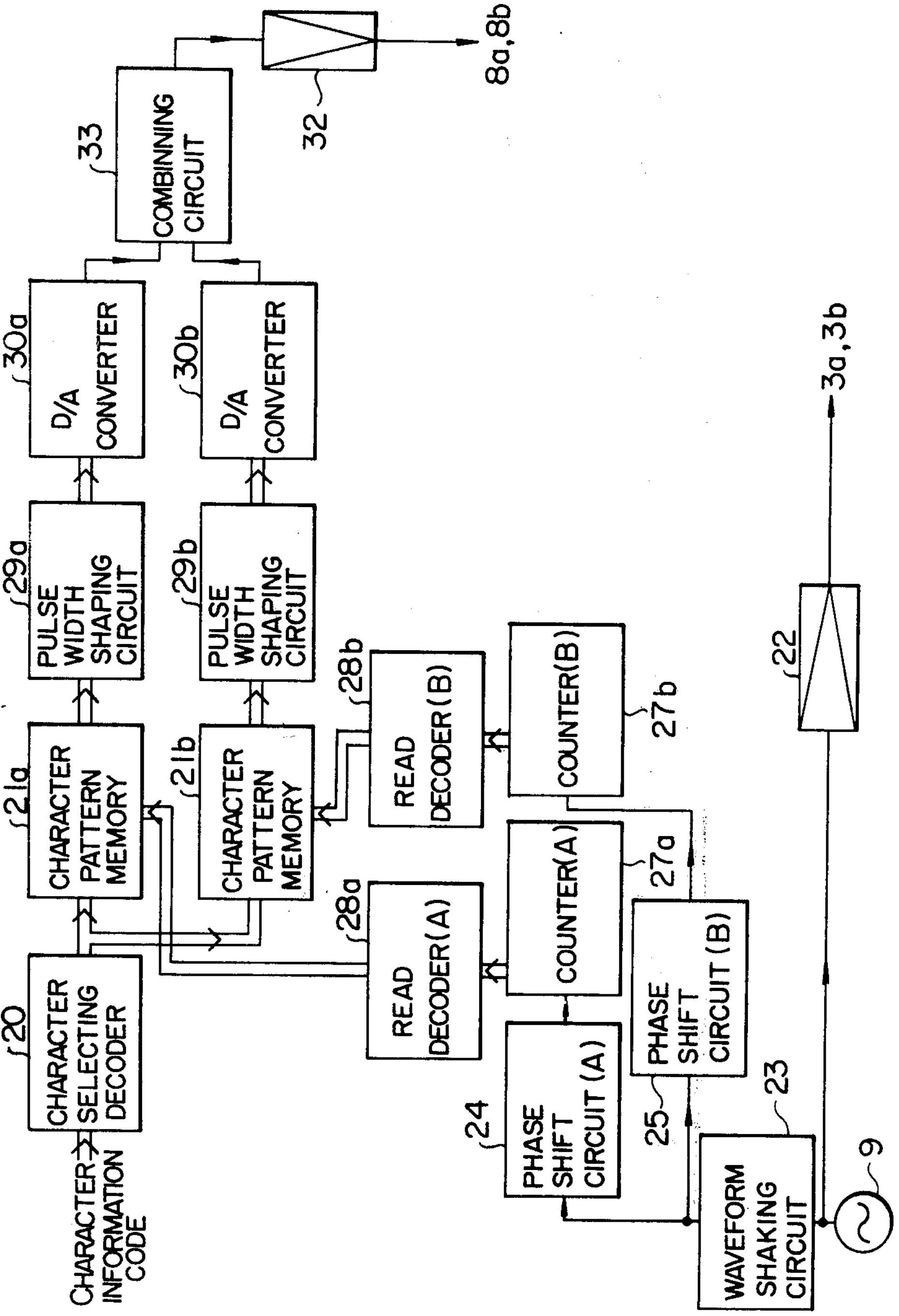
FIG. 14 is a block diagram of a system for attaining the character pattern signal control shown in FIG. 13.

In the arrangement shown in FIG. 14, the analog signal used for deflecting the large ink droplets 7*a* is produced independently of the analog signal used for deflecting the small ink droplets 7*b*, and these analog signals are combined with each other in the combining circuit 33 to be applied as a composite signal to the charging electrodes 8*a* and 8*b*.

We claim:

1. A liquid droplet supplying system comprising:

a liquid jet nozzle having a predetermined diameter for jetting a liquid material with predetermined characteristics under predetermined pressure;

vibration imparting means for mechanically vibrating said nozzle at a predetermined frequency;

electrical means for applying a predetermined electrical signal to the vibration imparting means for controlling said vibration imparting means, the nozzle diameter, pressure and characteristics of the liquid material, the vibrating frequency of the nozzle and the electrical signal applied to the vibration imparting means being cooperable for causing an end portion of a columnar stream of liquid jetted from said nozzle to separate into an alternate series of large liquid droplets and small liquid droplets and to fly said liquid droplets;

a phase signal circuit for receiving a signal from said electrical means and generating a phase signal synchronous with a phase at which small liquid droplets are separated from said columnar stream of liquid;

an information and signal source for producing an information signal voltage in response to the output signal of said first phase signal circuit for imparting to said small liquid droplets electric charges corresponding to the weight of said small liquid droplets and to a desired degree of deflection thereof;

charging means for imparting to said small liquid droplets electric charges corresponding to said information signal voltage;

deflecting means for imparting to said flying liquid droplets a deflection force corresponding to electric charges applied thereto; and collecting means for collecting as they are flown either the liquid droplets subjected to said degree of deflectin or non-deflected liquid droplets.

2. A liquid droplet supplying system comprising:

a liquid jet nozzle having a predetermined diameter for jetting a liquid material with predetermined characteristics under predetermined pressure;

an electro-mechanical transducing element for mechanically vibrating said nozzle at a predetermined frequency;

electrical means for applying a predetermined electrical signal to said electro-mechanical transducing element, the nozzle diameter, pressure and characteristics of the liquid material, the vibrating frequency of the nozzle, and the electrical signal applied to said transducing element being cooperable for causing an end portion of a columnar stream of liquid jetted from said nozzle to separate into an alternate series of large liquid droplets and small ink droplets and to fly said liquid droplets;

a first phase signal circuit for receiving a signal from said electrical means and generating a phase signal synchronous with a phase at which small liquid droplets are separated from said columnar stream of liquid;

an information signal source for producing an information signal voltage in response to the output signal of said first phase signal circuit for imparting to said small liquid droplets electric charges corresponding to the weight of said small droplets and to a desired degree of deflection thereof;

charging electrode means disposed for forming an electrostatic capacitance between said charging electrode means and said end portion of said columnar stream of liquid to be separated;

means for applying said information signal voltage to said charging electrode means;

a pair of deflecting electrodes opposed to each other with the flying path of said liquid droplets being located therebetween for forming a constant electric field at said flying path of liquid droplets; and collecting means for collecting as they are flown either the liquid droplets subjected to said desired degree of deflection or non-deflected liquid droplets.

3. A liquid droplet supplying system comprising:

a liquid jet nozzle having a predetermined diameter for jetting a liquid material with predetermined characteristics under predetermined pressure;

vibration imparting means for mechanically vibrating said nozzle at a predetermined frequency;

electrical means for applying a predetermined electrical signal to the vibration imparting means for controlling said vibration imparting means, the nozzle diameter, pressure and characteristics of the liquid material, the vibrating frequency of the nozzle and the electrical signal applied to the vibration imparting means being cooperable for causing an end portion of a columnar stream of liquid jetted from said nozzle to separate into an alternate series of large liquid droplets and small liquid droplets and to fly said liquid droplets;

a first phase signal circuit for receiving a signal from said electrical means and generating a first phase signal synchronous with a phase at which said small liquid droplets are separated from said columnar stream of liquid;

a second phase signal circuit for receiving a signal from said electrical means and generating a second phase signal synchronous with a phase at which said large liquid droplets are separated from said columnar stream of liquid;

a first information signal source for producing a first information signal voltage in response to the output of said first phase signal circuit for imparting to said small liquid droplets electric charges corresponding to the weight of said small liquid droplets and a desired degree of deflection thereof;

charging electrode means for receiving at least said first information signal voltage, said charging electrode means being disposed for forming an electrostatic capacitance between said charging electrode means and said end portion of said columnar stream of liquid to be separated;

deflecting means for imparting to said flying liquid droplets a deflection force corresponding to electric charges applied thereto; and collecting means for collecting as they are flown either the liquid droplets subjected to said desired degree of deflection or non-deflected liquid droplets.

4. A liquid droplet supplying system comprising:

a liquid jet nozzle having a predetermined diameter for jetting a liquid material with predetermined characteristics under predetermined pressure;

vibration imparting means for mechanically vibrating said nozzle at a predetermined frequency;

electrical means for controlling said vibration imparting means, the nozzle diameter, pressure and characteristics of the liquid material, the vibrating frequency of the nozzle and the electrical means being cooperable for causing an end portion of a columnar stream of liquid jetted from said nozzle to separate into an alternate series of large liquid droplets and small liquid droplets and to fly said liquid droplets;

a first phase signal circuit for receiving a signal from said electrical means and generating a first phase signal synchronous with a phase at which said small liquid droplets are separated from said columnar stream of liquid;

a second phase signal circuit for receiving a signal from said electrical means and generating a second phase signal synchronous with a phase at which said large liquid droplets are separated from said columnar stream of liquid;

an information signal source for receiving at least said first phase signal and generating at least one information signal voltage in synchronism with said received phase signals, said at least one information signal voltage corresponding to the weight of said small liquid droplets and a desired degree of deflection thereof;

change-over means for selectively applying one of said first and second phase signals to said information signal source;

a level adjusting circuit for modifying said at least one information signal voltage obtained from said information signal source into at least a first voltage characteristic required to impart to said small liquid droplet electric charges corresponding to a desired degree of deflection thereof in correspondence with said first phase signal applied to said information signal source;

means for imparting at least to said small liquid droplets electric charges corresponding to an output voltage of said level adjusting circuit;

deflecting means for imparting to said flying liquid droplets a deflection force corresponding to electric charges applied thereto; and collecting means for collecting as they are flown either the liquid droplets subjected to said desired degree of deflection or non-deflected liquid droplets.

5. A liquid droplet supplying system comprising:

liquid jet nozzle means having a predetermined diameter for jetting a liquid material with predetermined characteristics under predetermined pressure;

vibration imparting means for mechanically vibrating said nozzle means at a predetermined frequency;

electrical means for controlling said vibration imparting means, the nozzle diameter, pressure and characteristics of the liquid material, the vibrating frequency of the nozzle and the electrical means being cooperable for causing an end portion of a columnar stream of liquid jetted from said nozzle to separate into an alternate series of large liquid droplets and small liquid droplets and to fly said liquid droplets;

means for at least selectively applying to desired ones of said small liquid droplets an electric charge having a value corresponding to the size of the respective droplet and a desired amount of deflection thereof; and means for imparting to said flying liquid droplets a deflection force corresponding to electric charges applied thereto.

6. A liquid droplet supplying system according to claim 5, wherein said liquid jet nozzle means includes an ink jet nozzle containing ink supplied from a reservoir.

7. A liquid droplet supplying system according to claim 5, wherein said means for selectively applying includes charging electrode means for applying a charge to desired ones of said small liquid droplets in response to an output from said electrical means.

8. A liquid droplet supplying system according to claim 7, further including collector means positioned adjacent said deflecting means for collecting either the deflected or non-deflected droplets.

9. A liquid droplet supplying system according to claim 8, wherein said liquid material is ink and said system further comprises recording medium guiding means for guiding a recording surface so that recording dots are formed on said recording surface by the non-collecting ink droplets.

* * * * *